(12) United States Patent
Mulligan

(10) Patent No.: US 10,300,375 B2
(45) Date of Patent: May 28, 2019

(54) INTERCHANGEABLE AND ADJUSTABLE GAMING LAYOUT SYSTEM AND CONTROLLER

(71) Applicant: Timothy Mulligan, Edwardsville, PA (US)

(72) Inventor: Timothy Mulligan, Edwardsville, PA (US)

( * ) Notice: Subject to any disclaimer, the term of this patent is extended or adjusted under 35 U.S.C. 154(b) by 0 days.

(21) Appl. No.: 14/930,881

(22) Filed: Nov. 3, 2015

(65) Prior Publication Data

US 2016/0051891 A1   Feb. 25, 2016

Related U.S. Application Data

(63) Continuation-in-part of application No. 14/816,579, filed on Aug. 3, 2015, now abandoned, which is a
(Continued)

(51) Int. Cl.
| | |
|---|---|
| *A63F 11/00* | (2006.01) |
| *A63F 13/23* | (2014.01) |
| *A63F 13/2145* | (2014.01) |
| *A63F 13/25* | (2014.01) |
| *A63F 9/24* | (2006.01) |

(Continued)

(52) U.S. Cl.
CPC ............. *A63F 13/23* (2014.09); *A63F 9/24* (2013.01); *A63F 13/2145* (2014.09); *A63F 13/25* (2014.09); *G06F 3/04845* (2013.01); *G07F 17/322* (2013.01); *G07F 17/3209* (2013.01); *G07F 17/3211* (2013.01); *G07F 17/3258* (2013.01); *G07F 17/3293* (2013.01); *A63F 2009/241* (2013.01); *A63F 2009/2457* (2013.01)

(58) Field of Classification Search
CPC ...... A63F 13/23; A63F 13/2145; A63F 13/25; A63F 9/24; A63F 2009/241; A63F 2009/2457; G06F 3/04845; G07F 17/3209; G07F 17/3211; G07F 17/322; G07F 17/3258; G07F 17/3293
USPC .......................................................... 463/12
See application file for complete search history.

(56) References Cited

U.S. PATENT DOCUMENTS

| | | | | |
|---|---|---|---|---|
| 2,113,049 A | * | 4/1938 | Holland | ............... A63F 1/06 108/23 |
| 8,888,101 B1 | * | 11/2014 | McCrory | ............ G07F 17/322 273/274 |

(Continued)

*Primary Examiner* — Allen Chan
(74) *Attorney, Agent, or Firm* — James M. Smedley LLC; James Michael Smedley, Esq.

(57) ABSTRACT

The present invention generally relates to an interchangeable gaming layout powered by a display element that shows the background graphics and table layouts of a gaming table. Specifically, embodiments of the present invention are configured to provide the background graphics and table layout for a gaming table that is presented by a full color display element and is conveniently reconfigurable between games without requiring the entire gaming table and/or layout to be resurfaced. Further embodiments of the present invention are configured to allow for the gaming table and/or layout to provide content (e.g., multimedia content) during downtime or other intermission periods in game-play. Additionally, some embodiments of the present invention are configured with player interface elements that allow players to control a game-play decision or select a supplemental command.

10 Claims, 8 Drawing Sheets

Related U.S. Application Data continuation-in-part of application No. 14/308,694, filed on Jun. 18, 2014, now Pat. No. 9,098,969.

(60) Provisional application No. 61/976,230, filed on Apr. 7, 2014, provisional application No. 61/837,321, filed on Jun. 20, 2013.

(51) Int. Cl.
*G06F 3/0484* (2013.01)
*G07F 17/32* (2006.01)

(56) References Cited

U.S. PATENT DOCUMENTS

| | | | | |
|---|---|---|---|---|
| 2004/0160005 A1* | 8/2004 | Krise | ............ | A63F 1/06 273/274 |
| 2007/0241498 A1* | 10/2007 | Soltys | ............ | A63F 1/10 273/149 R |
| 2007/0259714 A1* | 11/2007 | Block | ............ | G06F 21/629 463/29 |
| 2009/0108532 A1* | 4/2009 | Darling | ............ | A63F 1/06 273/309 |
| 2010/0004051 A1* | 1/2010 | Walker | ............ | G07F 17/32 463/22 |
| 2010/0222148 A1* | 9/2010 | Kuhn | ............ | A63F 13/08 463/46 |
| 2011/0115158 A1* | 5/2011 | Gagner | ............ | G07F 17/3211 273/274 |
| 2013/0190082 A1* | 7/2013 | van Linden | ............ | A63F 13/08 463/31 |

* cited by examiner

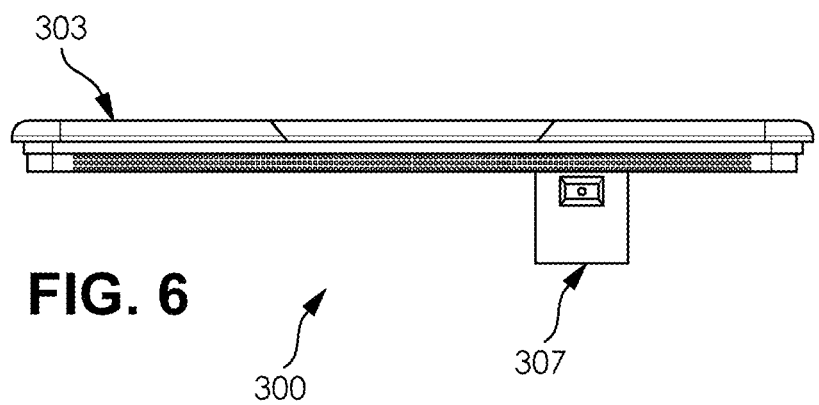
FIG. 6
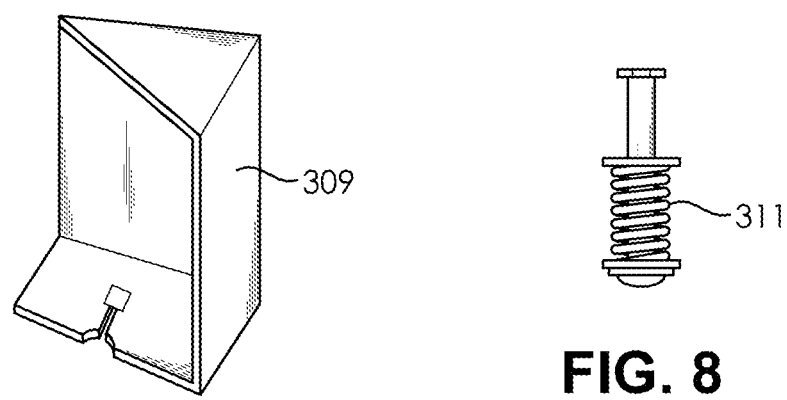
FIG. 7
FIG. 8

INTERCHANGEABLE AND ADJUSTABLE GAMING LAYOUT SYSTEM AND CONTROLLER

CROSS-REFERENCE TO RELATED APPLICATIONS

This application is a continuation-in-part of U.S. Non-Provisional Utility patent application Ser. No. 14/816,579, filed Aug. 3, 2015, and entitled "Interchangeable and Adjustable Gaming Layout System And Controller", which is a continuation-in-part of U.S. Non-Provisional Utility patent application Ser. No. 14/308,694, filed Jun. 18, 2014, and entitled "Interchangeable Gaming Layout Powered by a Display Element", which claims the benefit of both U.S. Provisional Patent Application No. 61/976,230, filed Apr. 7, 2014 and entitled "Interchangeable Gaming Layout Powered by a Display Element" and U.S. Provisional Patent Application No. 61/837,321, filed Jun. 20, 2013 and entitled "Interchangeable Gaming Layout Powered by LEDs via a Computer Program", the entire disclosures of each and all of the above mentioned references are hereby incorporated herein by reference.

FIELD OF THE INVENTION

The present invention generally relates to an interchangeable and adjustable gaming layout system. Specifically, embodiments of the present invention are configured to provide graphics and table layout for a gaming table that is presented by a full color display element and is conveniently reconfigurable between displayed content without requiring the entire gaming table and/or layout to be resurfaced. Further embodiments of the present invention provide a controller that allow for the ad-hoc generation of gaming formats based on template or other image repositories (i.e., libraries) for the purpose of allowing users to build complete gaming layouts on the fly and one or more player interface element that allow player to interact with the game being played on the gaming table.

BACKGROUND OF THE INVENTION

When a casino wants to change a game layout to another game it first requires all the gaming value cheques to be removed. Then the maintenance department has to be called and physically remove the layout. A fresh new layout is then used and installed onto the table surface. Once that is finished then the table must have value cheques put back onto the table to resume gaming. This work in total is a few hours of labor per table. The result is vast expenditures or resources, both in terms of labor and money, in order to switch out table surfaces.

The layouts currently used in the field are printed on physical felt and can only be used in one specific game. These layouts take hours to change and it is not worth the casinos trouble to change games back and forth due to business demands. Since most casinos are open 24/7, having a table off of the casino floor for any amount of time results in lost revenues.

Therefore, there is need in the art for an interchangeable and adjustable gaming layout system and controller, configured to provide a gaming table/layout that does not require the changing of the felt or other gaming elements every time a casino wants to change the casino game and further allows users to generate and display proprietary gaming layouts on the fly using image repositories or other content or data stores. These and other features and advantages of the present invention will be explained and will become obvious to one skilled in the art through the summary of the invention that follows.

SUMMARY OF THE INVENTION

Accordingly, it is an object of the present invention to provide an interchangeable gaming table with a layout that does not require the changing of the felt or other gaming elements every time a casino wants to change the casino game, as well as a player interface element configured to display and receive player inputs comprising game-play decisions and supplemental commands.

According to an embodiment of the present invention, an interchangeable gaming table apparatus, the apparatus comprising: a player interface element positioned at a plurality of player positions arranged around a playing surface of an interchangeable gaming table, wherein said player interface elements are configured to display and receive player inputs comprising game-play decisions and supplemental commands.

According to an embodiment of the present invention, the interchangeable gaming table apparatus further comprises a rail cushion, wherein said player interface element primarily comprises a touchscreen display embedded in said rail cushion.

According to an embodiment of the present invention, the player interface element primarily comprises a touchscreen display secured by a player interface mounting element that extends from said interchangeable gaming table.

According to an embodiment of the present invention, the player interface element is formed from one or more display panels that form said playing surface of said gaming table.

According to an embodiment of the present invention, the supplemental commands are configured to provide control over guest hospitality selections and access to communications platforms comprising social media, message boards, and chat applications.

According to an embodiment of the present invention, the interchangeable gaming table apparatus further comprises a supplemental connection element.

According to an embodiment of the present invention, the supplemental connection element extends from said player interface element.

According to an embodiment of the present invention, the supplemental connection element is a charging cable.

According to an embodiment of the present invention, an interchangeable gaming table apparatus, the apparatus comprising one or more light emitting display panels communicatively connected to a processing element, wherein each of said one or more light emitting display panels has a light emitting surface portion that displays gaming table graphics; a storage medium configured to store software elements, wherein said software elements are computer executable code stored in non-volatile memory that control the display of said gaming table graphics and are executable by said processing element to direct what is displayed on said one or more light emitting display panels; a padding layer covering abutting said light emitting surface portion of said one or more light emitting display panels; a felt cloth material covering and abutting said padding layer, wherein said gaming table graphics are visible through said felt cloth material; and a player interface element positioned at a plurality of player positions arranged around a playing surface of an interchangeable gaming table, wherein said player interface elements are configured to display and receive player inputs comprising game-play decisions and supplemental commands.

According to an embodiment of the present invention, the interchangeable gaming table apparatus further comprises a rail cushion, wherein said player interface element primarily comprises a touchscreen display embedded in said rail cushion.

According to an embodiment of the present invention, the player interface element primarily comprises a touchscreen display secured by a player interface mounting element that extends from said interchangeable gaming table.

According to an embodiment of the present invention, the one or more of said light emitting display panels are also configured to function as said player interface element.

According to an embodiment of the present invention, an interchangeable gaming table apparatus, the apparatus comprising: a plurality of display elements arranged proximate to one another such that together the plurality of display elements form a playing surface; a display element controller communicatively connected to each of said plurality of display elements, wherein said display element controller is further communicatively connected to a library of template images, wherein said library of template images comprises a plurality of images necessary for recreating a game on said playing surface when said plurality of images are aligned and presented across said plurality of display elements, wherein said display element controller retrieves said plurality of images and aligns each individual image of said plurality of images with the appropriate display element of said plurality of display elements in order to display said game on said playing surface, wherein said game is selected from a plurality of games available to said display element controller; a surface material, laid on top of said playing surface and configured to allow for the transmission and display of said plurality of images from said plurality of display elements through said surface material and wherein said surface material replicates the friction, padding and other physical properties provided by standard gaming table surfaces; and a player interface element positioned at a plurality of player positions arranged around a playing surface of an interchangeable gaming table, wherein said player interface elements are configured to display and receive player inputs comprising game-play decisions and supplemental commands.

According to an embodiment of the present invention, the one or more of said display elements are also configured to function as said player interface element.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

FIG. 6 illustrates a front view of an exemplary embodiment of an interchangeable gaming layout in accordance with an embodiment of the present invention;

FIG. 7 illustrates an exemplary embodiment of a discard rack of an interchangeable gaming layout in accordance with an embodiment of the present invention;

FIG. 8 illustrates an exemplary embodiment of a securing means for attaching different gaming elements to an interchangeable gaming layout in accordance with an embodiment of the present invention;

DETAILED SPECIFICATION

The present invention generally relates to an interchangeable gaming layout powered by a display element that shows the background graphics and table layouts of a gaming table. Specifically, embodiments of the present invention are configured to provide the background graphics and table layout for a gaming table that is presented by a full color display element and is conveniently reconfigurable between games without requiring the entire gaming table and/or layout to be resurfaced. Further embodiments of the present invention are configured to allow for the gaming table and/or layout to provide content (e.g., multimedia content) during downtime or other intermission periods in game-play. Additionally, some embodiments of the present invention are configured with player interface elements that allow players to control a game-play decision or select a supplemental command.

Figure 1:
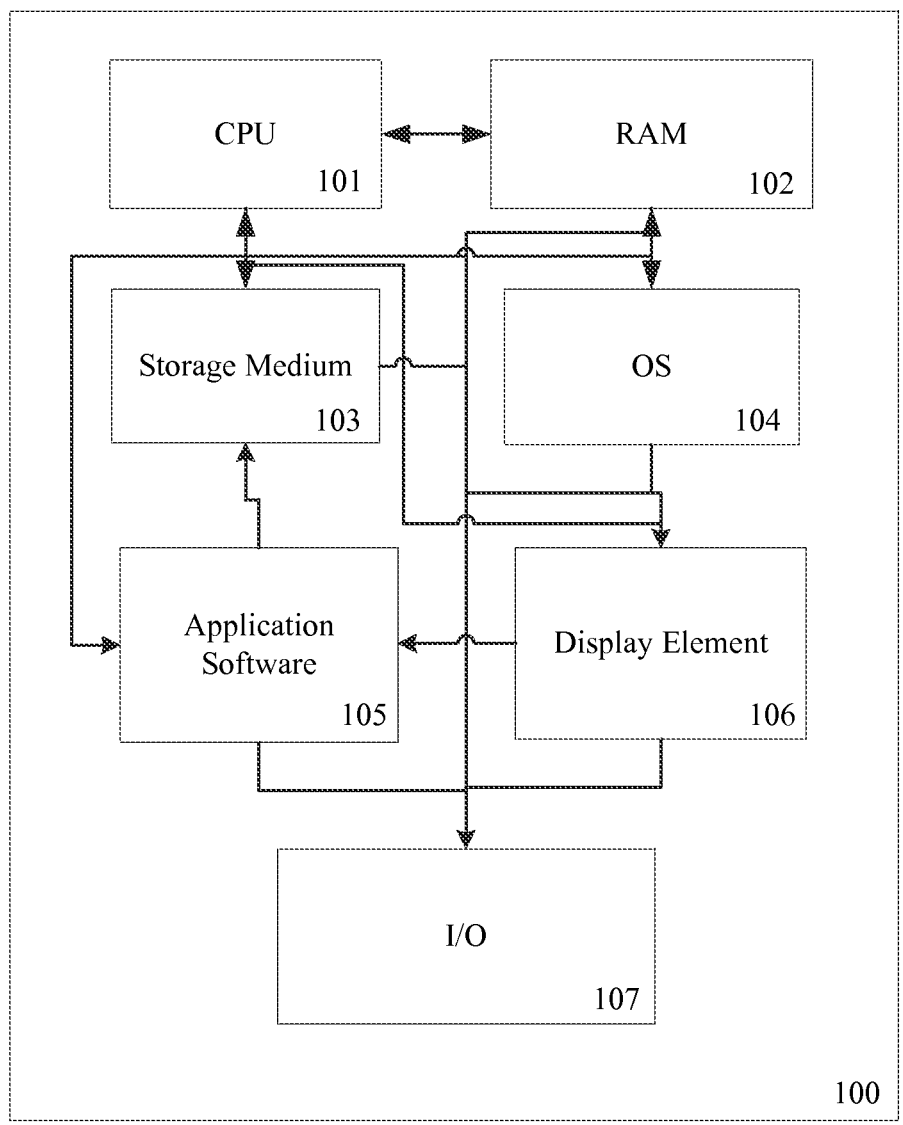
FIG. 1 illustrates a schematic overview of a computing device, in accordance with an embodiment of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, a storage medium (e.g., hard disk drive, solid state drive, flash memory, cloud storage)

103, an operating system (OS) 104, one or more application software 105, a display element 106 and one or more input/output devices/means 107. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

Figure 2:
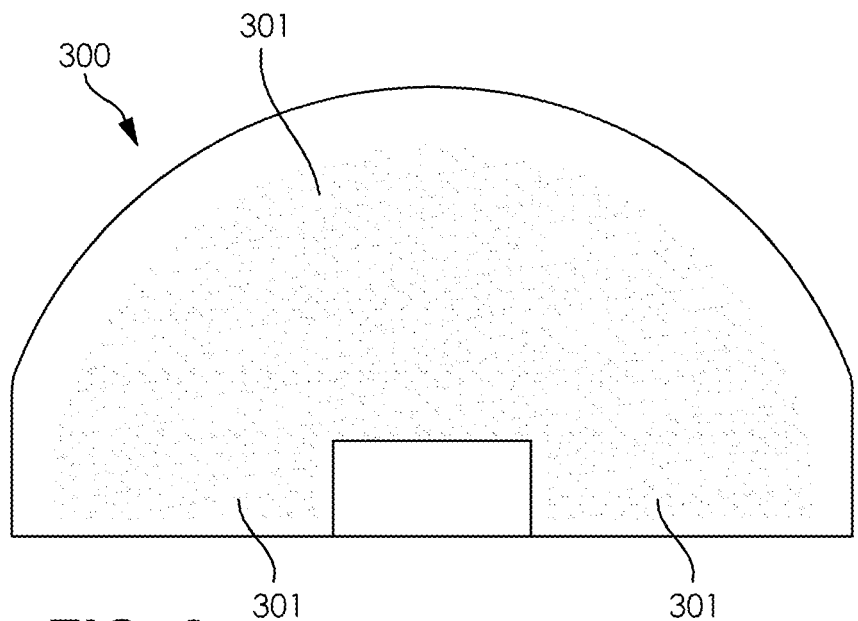
FIG. 2 illustrates an exemplary embodiment of an interchangeable gaming layout in accordance with an embodiment of the present invention.
Figure 3:
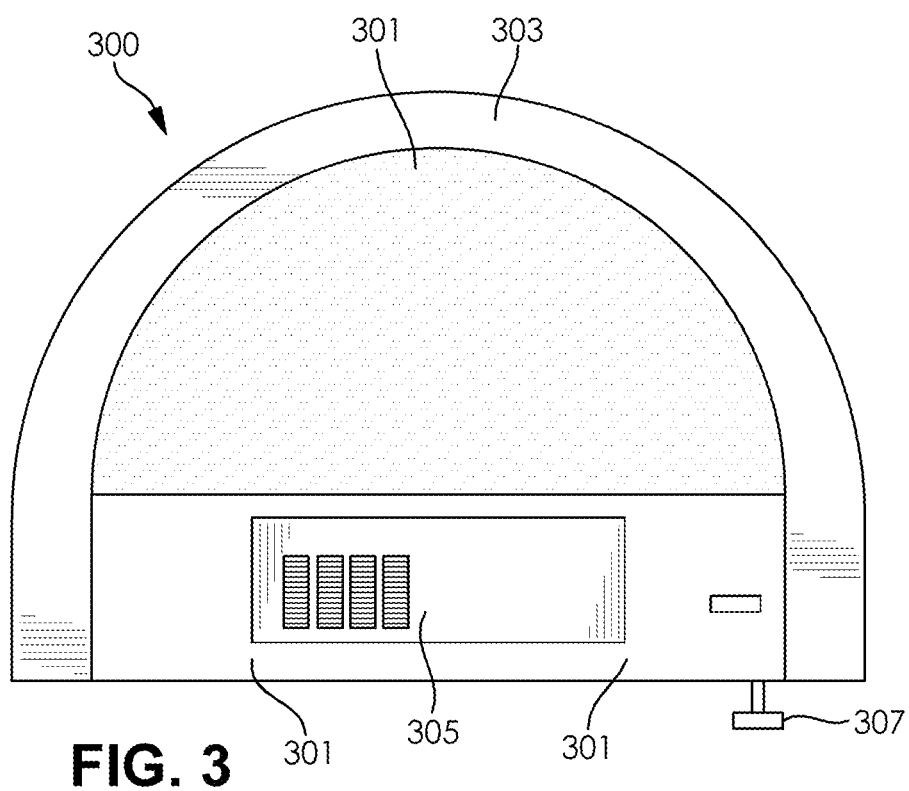
FIG. 3 is a top view of an exemplary embodiment of an interchangeable gaming layout in accordance with an embodiment of the present invention.

According to a preferred embodiment of the present invention, the system may utilize a micro-pc, such as the ARDUINO UNO and a proprietary display element formed in the shape of a standard casino gaming table (See, FIGS. 2 and 3). In a preferred embodiment, the display element can be formed in the shape of any standard casino game table (including, but not limited to, blackjack tables of varying shape, craps tables, baccarat tables, kidney shaped poker tables and roulette tables), any other custom or unique gaming table, or even a traditional board game. In the preferred embodiment, the micro-pc being or other computing device that is being used as the display element controller (or computer controller) may be located at the back of the gaming table so that is accessible by a dealer or other game operator. In alternate preferred embodiments, the display element controller is located at any position on, under, or otherwise attached to the table where it is accessible to the dealer or game operator. In further preferred embodiments, the display element controller could be remote from the gaming table, such as in a centralized control room remote from the gaming floor of a casino, or otherwise from any remote computing device, connected to the various display elements via a wired or wireless connection for the provision of and/or receipt of information between the display element controller and display elements. As detailed later, communication between the display element and processing components could be multi-directional, allowing for the display element to act as an input device for the computing device. Further, in certain embodiments, the display element controller can be divided between two or more devices, such as a controller attached to the table for operation by the dealer and another controller in a centralized control room or on a computing device controlled by a pit boss or similar management user. In these embodiments, a single table, comprising one or more display elements, may have operations be controlled by a plurality of different users (e.g., dealer, pit boss, remote gaming management) and each user could have their own set of operations and functionality available to them. One of ordinary in the art would appreciate there are many possible arrangements for the computing device, and embodiments of the present invention are contemplated for use with any such arrangement.

In an exemplary embodiment according to the present invention, data may be provided to the system, stored by the system and provided by the system to users of the system across local area networks (LANs) or wide area networks (WANs). In a preferred embodiment, the LANs or WANs may be wired or wireless (including, but not limited to WiFi). In accordance with the previous embodiment, the system may be comprised of numerous servers communicatively connected across one or more LANs and/or WANs. For instance, multiple interchangeable gaming layout apparatus could be communicatively connected with processing components (e.g., servers located in a control room at a casino) located remotely from the actual display elements (i.e., gaming tables). One of ordinary skill in the art would appreciate that there are numerous manners in which the system could be configured and embodiments of the present invention are contemplated for use with any configuration.

In general, the methods provided herein may be consumed by the interchangeable gaming layout system whether connected to a network or not. According to an embodiment of the present invention, some of the applications of the present invention may not be accessible when not connected to a network, however an interchangeable gaming layout may be able to compose data offline that will be consumed by other components of the system when the interchangeable gaming layout is later connected to a network.

According to an embodiment of the present invention, an interchangeable gaming layout system is comprised of one or more display elements, one or more processing elements (e.g., micro-PC), and one or more storage mediums configured to store software elements configured to direct the processing element(s) to control the display element(s) for the purpose of displaying one or more types of multimedia content, including, but not limited to, i) a plurality of games (e.g., casino games, blackjack, Spanish 21, poker, roulette, progressive jackpots, board games and other video supported games of chance); ii) advertising content; iii) personalized content; iv) other video or multi-media content; v) side games/bets (e.g., insurance for blackjack, in bets for blackjack, Super Sevens, Royal Match, Bet the Set,) and vi) any combination thereof. The system may further be configured with a human interface device (e.g., keyboard, touchscreen, series of buttons, mouse, controller) configured to allow a user to interact with the system and effect changes where necessary (e.g., select new game type, select content type, perform maintenance). In other embodiments, interface with the system may be done by a remote connection through a communications means (e.g., Bluetooth®, WiFi, Ethernet connection, USB connection, Firewire, Thunderbolt, Near Field Communication (NFC)) to the system.

According to an embodiment of the present invention, an interchangeable gaming layout system may be further comprised of a display element control module. In a preferred embodiment, the display element control module is configured to control which of the one or more types of multimedia content is presented on the display element. In a preferred embodiment, the display element control module facilitates what is presented on the display element by regulating the software elements that control the processing element to display the one or more types of multimedia content. In the preferred embodiment, the display element control module may receive commands directly from an operator that causes the processing element to execute a particular software element. In an alternate preferred embodiment, the display element control module regulates commands that are automatically generated based on an event, including but not limited to, an end of a game, while a table layout is being changed, during pauses in game-play (e.g. while a deck of cards is being shuffled), or any other programmed event. In some embodiments, the display element control module is located at the game table, but may receive commands from a remote server or other computing device via a network (e.g. WiFi connection) or wireless connection (e.g. Bluetooth®). In alternate embodiments, the display element control module may be configured to facilitate additional or fewer functions. In a preferred alternate embodiment, the display element control module may also be configured to record data. As an illustrative example, the display element control module may be configured to record the length of time and time of day a particular game is played. One of ordinary skill in the art would appreciate that a display element control module could be configured to accomplish a variety of tasks, and embodiments of the present invention are contemplated for use with any such task.

According to an embodiment of the present invention, the display element and the processing element may be communicatively connected via one or more connection means, such as a printed circuit board allowing for electrical connections between the processing element and the display element. In other embodiments, the display element may be connected to a processing element via a communications transmission means (e.g., CAT5E cable, HDMI cable, wireless connection). In these embodiments, the display element may be further comprised of components capable of translating signals received from the communications transmission means and interpreted into appropriate display data. Further, where the display element is capable of acting as an input device, the display element may have components capable of turning input into signal data to transmit over the communications transmission means to the processing element(s). One of ordinary skill in the art would appreciate that there are numerous methods and components that could be utilized for making the connections between the processing element and the display element, and embodiments of the present invention are contemplated for use with any type of such connection.

According to an embodiment of the present invention, the display element is a dot matrix LED display that is formed in the shape of any standard gaming table (e.g., poker table, blackjack table, craps table, baccarat table, roulette table), a traditional board game (e.g. chess, checkers, Monopoly®, Scrabble®, etc.) or any customized shape required by a new, unique, or nonstandard game or gaming table. For example, customized gaming tables may include, but are not limited to one-off or unique gaming tables that are proprietary to a particular casino or other gaming operator. In a preferred embodiment, the display element covers substantially the entire surface of the gaming table form. This allows for gaming content and other content to be displayed across the entire width and depth of the gaming table or substantially the entire width and depth of the gaming table. In other embodiments, the display element may be comprised of an alternative display element type (e.g., plasma display, liquid crystal display (LCD), AMOLED, organic light emitting diode (OLED)). In a preferred embodiment, the display element may be one single display component. In an alternate preferred embodiment, the display element maybe comprised of multiple individual display components that are being directed by the display element controller to function in unison as a single, cohesive display element. In embodiments with multiple individual display components, each individual display component may attach to a display element attachment point on the display element. When all of the individual display components are attached, a single, cohesive display is formed. One of ordinary skill in the art would appreciate that there are numerous types of display elements that could be utilized with embodiments of the present invention, and embodiments of the present invention are contemplated for use with any type of display element appropriate for the format described herein.

According to an embodiment of the present invention, the use of multiple individual display components allows for the construction of gaming tables and gaming table playing surfaces that have both linear and non-linear shapes. In a preferred embodiment, the multiple individual display components may be rearranged to create a gaming table top that is configured in any desirable shape. In the preferred embodiment, each of the display panel components can be variably sized and shaped so as to increase the flexibility of the gaming table and to accommodate a gaming table with any desired layout. As stated above, the individual display panel components can work as an interconnected unit that displays a single cohesive image across the entirety of the gaming table surface. Alternatively, each of the individual display panels can operate independently as the circumstance of a given application so require. One of ordinary skill in the art would appreciate that the multiple individual display components could be arranged in any desired pattern or shape, and embodiments of the present invention.

According to an embodiment of the present invention, the interchangeable gaming table may use modules of independent LED lights. In a preferred embodiment, the individual modules of LED lights may be used to form curves that interconnect with a curved structure on the gaming table. In the preferred embodiment, the modules of independent LED lights can form an image that is bounded by both linear and curved shapes. Additionally, any of the images formed by the various display components and LED modules are designed to accommodate and account for any of the curved or linear structures of the gaming table that provide structure or support to the display components.

In certain embodiments, the display element may be able to receive input or otherwise detect interaction such that the display element may be an interactive component of the system. In this manner, the display element can perform a variety of functions, including, but not limited to, detecting touches or other interactions of a player, detecting movement of game components (e.g., cheques, chips, cards, dice), reading/scanning data (e.g., game cards, player club cards, driver's licenses), counting chips, determining winning hands, calculating winnings, or any combination thereof. In order to affect this, the display element may be further configured with additional components, including, but not limited to, cameras, resistive touch screens, capacitive touch screens, or any combination thereof. One of ordinary skill in the art would appreciate that there are numerous types of components for receiving input information that could be utilized with embodiments of the present invention, and embodiments of the present invention are contemplated for use with any appropriate input component.

According to an embodiment of the present invention, a top surface of the display element is covered with a surface material configured to allow for the light and content transmitted by the display element to pass through and be visible through the surface material, while providing a tactile sensation similar to that of a standard gaming table/layout. Since there is an intrinsic value to the look and feel of the standard gaming table that players have come to know and enjoy, replicating this feel is an important aspect of certain embodiments of the present invention. Further, for games that require cards, dice or other gaming components, the surface material is utilized to replicate the friction, padding and other physical properties provided by standard gaming table surfaces (e.g., felt). Replicating the properties of the standard gaming table surface helps keep the feel of the game the same for the players (e.g., cards slide the same, dice bounce the same, chips move the same).

According to an embodiment of the present invention, another feature of the surface material must replicate or otherwise approximate a flexibility and/or padding level that is similar to a standard gaming table. The padding level is required to allow for dealers and players the ability to interact with the gaming components (e.g., cards, chips, and dice). Without the appropriate level of padding, players and dealers will have a difficult time lifting, moving or otherwise interacting with the various gaming components. Matching a padding level with the ability to allow images/light from the display element to pass through is crucial to preferred embodiments of the present invention. In other embodiments, the surface material may be more or less flexible than a standard gaming table. The appropriateness of any flexibility level or padding level is generally based upon usability of the table for its intended purpose and embodiments of the present invention are contemplated for use with any appropriate flexibility level or padding level.

According to an embodiment of the present invention, the surface material may be, but is not limited to, fabric, cloth, linen, felt or other suitable material. Clear, transparent or translucent materials may be preferred in order to allow the maximum amount of light from the display element to be transmitted through. One of ordinary skill in the art would appreciate that there are numerous types of materials that could be utilized with embodiments of the present invention, and embodiments of the present invention are contemplated for use with any suitable type of surface material. In a preferred embodiment, the surface material fabric translucency is able to support fine resolution of dot pitch to allow players and dealers to visualize text displayed from the display element through the surface material. Additionally, preferred surface materials will have color, tone and hue to support accurate presentation of colors from the display element.

According to an embodiment of the present invention, the surface material is a felt like fabric substantially consistent with or evocative of traditional gaming table felt. In a preferred embodiment, the surface material is a blank felt covering. A blank material supports any and all images that may be displayed by a display element or display component, as there are no markings on the surface to block or otherwise interfere with the display of any images. In the preferred embodiment, a felt material that is a gradient of gray in color is best suited to show blacks, whites, and all other colors and images appropriately. In alternate embodiments, the felt surface material may be of any suitable color, as the display components may be adjusted to display colors in a manner that takes into account the color or gradient of the felt surface material, thereby ensuring that the color and images perceived by a user are the desired colors and images.

According to an embodiment of the present invention, the display element may be an OLED display. In a preferred embodiment, the OLED display positioned over top of the surface material. In the preferred embodiment, the OLED display is durable, flexible, and thin enough to allow the properties of the surface material (e.g. padding, flexibility, tactility, etc.) to be felt through the OLED display. One of ordinary skill in the art would appreciate that there are numerous suitable arrangements for the surface material and display element, and embodiments of the present invention are contemplated for use with any such arrangement.

According to an embodiment of the present invention, the display is a dot matrix LED display. In a preferred embodiment, the dot matrix LED display is positioned beneath the surface material. In the preferred embodiment, the surface material allows light from the dot matrix LED display to pass through the surface material so that it can be perceived by a user. One of ordinary skill in the art would appreciate that there are many suitable arrangements for the display element and the surface material and embodiments of the present invention are contemplated for use with any such arrangement.

According to an embodiment of the present invention, various gaming elements may be attached to the interchangeable gaming layout system for use in one or more games. These gaming elements may be secured to the table via a securing means, such as, but not limited to, screws, nuts, bolts, pins, clips, magnets, or any combination thereof. In a preferred embodiment, each of the gaming elements may be configured for quick removal and replacement, in order to allow for quick swapping of games used on the interchangeable gaming layout system.

Figure 10:
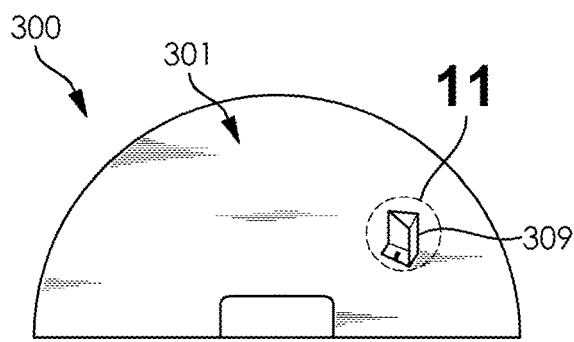
FIG. 10 illustrates an exemplary embodiment of a gaming element attached to the surface of an interchangeable gaming layout in accordance with an embodiment of the present invention.
Figure 11:
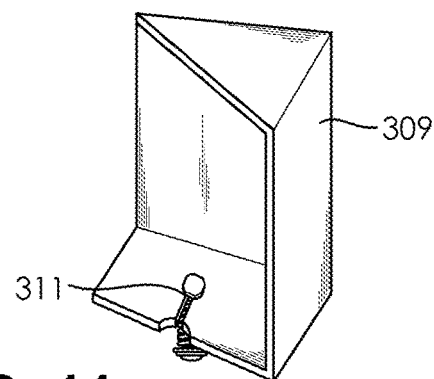
FIG. 11 illustrates an exemplary embodiment of a securing means attaching a gaming element to the surface of an interchangeable gaming layout in accordance with an embodiment of the present invention.

Gaming elements may include, but are not limited to, card discard racks, card shoes, dice holders, chip holders, or any combination thereof (See, FIGS. 7, 10, and 11). One of ordinary skill in the art would appreciate there are numerous types of gaming elements that could be utilized with embodiments of the present invention, and embodiments of the present invention are contemplated for use with any type of gaming element.

According to an embodiment of the present invention, the interchangeable gaming layout system may further be comprised of a multi-compartment drop box. The multi-compartment drop box allows the system to provide separate holding compartments for monies received for each game played on the system. In this manner, casinos are provided a method for tracking what games are performing the best by separating out the money into separate compartments. Changing of the multi-compartment drop box may be done manually, such as by a dealer, pit boss or other person. In other embodiments, the processing element of the system may be communicatively connected to the multi-compartment drop box and be configured to automate the switching of compartments depending on what game is selected. Any exemplary embodiment of the multi-compartment drop box can be seen in FIG. 9.

According to an embodiment of the present invention, the multi-compartment drop box can be a manually or electronically controlled attachment that will enable monies collected on the table to be associated with the gaming surface being displayed. It could include an electronic system that is able to identify the denomination and count the currency dropped into it and record on the computer or physically separate the money. The system could use electronics to control and count what money is associated with that game(s) displayed. Alternatively a paper system could be employed to include a written record in the box or other means to monitor cash on the table.

According to an embodiment of the present invention, the multi-compartment drop box may be configured to batch load a player's cash in a significant size in order not to slow game-play. In order to accomplish this, the multi-compartment drop box may include a component configured to identify denominations, similar to those found in an ATM machine or other money counting machines, in order to count and display the amount in each batch of bills contained in each batch separately fed into it.

According to an embodiment of the present invention, the multi-compartment drop box may be configured to identify the player who supplied the currency. This may be accomplished through interaction with the display element controller or other controller device configured to identify the user via input received from a user or via automatic identification (e.g., video surveillance identification). One of ordinary skill in the art would appreciate that there are numerous methods for providing identification input information to the multi-compartment drop box component in order to identify players who supply currency for deposit into the drop box.

According to an embodiment of the present invention, the multi-compartment drop box may be imbedded into a gaming table and/or as a separate unit accessible to the dealer or players.

According to an embodiment of the present invention, the multi-compartment drop box may further embodiment allow for access for players to deposit the cash and provide and amount to the dealer to exchange for chips. This may help prevent delay in game-play for a gaming layout due to changing of cash for chips. One method for effecting this would be to have a bill insert slot at each player designated seat, similar to existing slot machines. Once bills are inserted, the dealer could dispense the appropriate chips to the player or the device accepting the bills could dispense the appropriate chips.

According to an embodiment of the present invention, the multi-compartment drop box can also include a computer processor that is able to instantly upload data concerning the amounts dropped into the box, cash exchanged by a player and/or denominations of bills in the box to a central computing system via a communications means (e.g., wired connection, wireless connection).

According to an embodiment of the present invention, the multi-compartment drop box can have redundant on-board memory, removable media and allow for the identification of the box and/or table associated with the box. In this manner, the multi-compartment drop box can provide an audit trail for placement and use of the particular box in any given setting.

According to an embodiment of the present invention, the multi-compartment drop box is configured to allow for the identification of the game used when the currency was collected if the table layout or game displayed is changed by electronic or other means. In this manner, the winnings/loss of each game can be analyzed, as well as amount of monies deposited during game-play of a specific game (including analysis of side bets/side games).

According to an embodiment of the present invention, the system is configured to include modules allowing for logs with the ability to identify cash received by shift, hour, player, dealer and/or other relevant information.

According to an embodiment of the present invention, the multi-compartment drop box may further be configured to incorporate a display element or other element for the visual presentation of data. The display element of the box may be configured to indicate the amount of money in the box, amount of money in each compartment of the multi-compartment box, time information (e.g., time since last emptied, time since put into service, time until box scheduled to be taken off floor), or any combination thereof.

According to an embodiment of the present invention, the multi-compartment drop box is configured to further comprise a secure box that will allow for the money collected to be securely transported including a memory or other writeable media or process to note the amount/bill count and/or denominations of currency in the box. In this manner, the box is able to provide an auditing trail and assist with the identification of any shorting or other illegal tampering with the box.

According to an embodiment of the present invention, the multi-compartment drop box may be configured such that the entire unit can be portable allowing for the secure transfer of the cash in an enclosed, sealed, and counted environment.

According to an embodiment of the present invention, the multi-compartment drop box may include a device to carefully stack bills to conserve space and/or a sorter to stack bills according to denomination.

According to an embodiment of the present invention, the multi-compartment drop box is configured to separate bills in specific valuations or quantities by denomination and/or wrap the bills in an acceptable format to facilitate further handling.

In a preferred embodiment of the multi-compartment drop box, the device contains a batch loader that will allow for the feeding of a plurality of currency bills up to a significant quantity so as to ensure the ability to exchange large amounts of chips for the amount presented. Preferably the batch feeder will allow for an additional batch of currency to be loaded in quick succession and ensure that each stack of bills is counted as a separate entity so as to allow the corresponding payout to the player to be made. In a preferred embodiment, a means to identify the player associated with the exchange will be available by utilization of an identity card, token, pin code or other personal association means.

According to an preferred embodiment of the multi-compartment drop box, to ensure security, the batch loader will preferably have a chamber that will securely hold the stack of bills exchanged, allow for multiple stacks to be loaded and secured from access during the counting operation. The bills will pass through a denomination checker and be counted. The sum of the drop will be determined by a computer processor and in an embodiment be displayed on an led or video panel on the device, an external monitor/device, and/or sent to a central processor allowing the player, dealer and/or staff to review the amount of the drop and ensure it corresponds to the manual count conducted before the bills are placed into the batch loader.

In a preferred embodiment, the counting device will sort the bills by denomination, stack the bills neatly to conserve space and/or allow for of conducting banding, wrapping or collection of sorted counted currency by other means in an appropriate quantity for future handling.

According to a preferred embodiment of the present invention, the multi-compartment drop box device will further include a secure locked chamber to allow for removal and transport of collected currency to a collection point in a secure manner or for the entire device to be securely transported. In the preferred embodiment, the device or collection chamber will have a memory device, recorder, display or other means to identify the table, amounts contained in the box and other data important for the user.

In a preferred embodiment, the device will be able to log data important to the user. In use with a table with a changeable playing surface, the device will be able to record the game type, time of use and identify amounts exchanged during that specific game-play.

According to a preferred embodiment of the present invention, the multi-compartment drop box device can be set to be attached to the gaming surface, embedded in the gaming surface or separated from the gaming table surface in an area convenient for access by the dealer or players. Additionally embodiments could be multiple access points to the batch loader to allow player to submit their cash themselves.

While many of the novel features above are detailed with respect to a multi-compartment drop box device, certain embodiments may be utilized with a drop box device with a single compartment. In these embodiments, several of the above features could be incorporated. Further, in a single compartment embodiment, software and other components can be utilized to make the single compartment embodiment function like a multi-compartment box, except for the specific separation of the currency into distinct compartments.

According to an embodiment of the present invention, the interchangeable gaming layout system may further provide a protective layer over the display element to protect the display element from damage (e.g., physical damage from repeated game-play, environmental damage from spills or other hazards). In a preferred embodiment of the present invention, the protective layer may be a polycarbonate cover. In the preferred embodiment, the protective layer may feature a padded layer that is intended to help replicate the padded feel of a standard gaming table surface. One of ordinary skill in the art would appreciate that there are numerous types of protective layers that could be utilized with embodiments of the present invention, and embodiments of the present invention are contemplated for use with any type of protective layer.

According to an embodiment of the present invention, the interchangeable gaming layout system may further be comprised of one or more player interface elements. In a preferred embodiment, the top of the gaming table or playing surface may be configured with a player interface element at each betting area or player position of the gaming table. In the preferred embodiment, the player interface element may be a touch screen display. In an alternate embodiment, the player interface element may be a display screen and keyboard or other interface element, such as a mouse or touchpad. In the preferred embodiment, the player interface element will be configured to allow a player to enter a decision, command, or similar game-play function that is relevant to the game being played. As an illustrative example, when the interchangeable gaming table is configured in a blackjack layout, the player interface element could be configured with buttons or inputs that would allow a user to Hit, Stand, Split, or Double down when it is that player's turn. Additionally, the player interface element may be configured to have other supplemental function or command buttons that would be relevant in a casino. For example, the player interface element could allow a player to control a variety of guest hospitality selections that include, but are not limited to, booking hotel rooms, making restaurant reservations, ordering drinks, and requesting show tickets. Furthermore, the player interface element may allow players to access communications platforms, including social media or message boards, chat rooms, or in-house communications forums. Access to such communications platforms could be limited to breaks in the game, such as between hands, during shuffling of cards, or other pauses in game-play. One of ordinary skill in the art would appreciate are number of game control and command functions that could be displayed and executed by the player interface element, and embodiments of the present invention are contemplated for use with any such game control or command functions.

According to an embodiment of the present invention, the player interface element may be a touchscreen display such as tablet computer or similar touchscreen computing device. In a preferred embodiment, such touchscreen display may be configured by a casino or game operator with one or more process controls that limit certain operations or otherwise control the functionality of the touchscreen display in its capacity as a player interface element. As an illustrative example, the player interface element may be configured to prevent certain functions or access to certain software applications during game-play. This could be usefully for preventing players from accessing information or applications that could be used to cheat, trick, or otherwise deceive the game operator and other players. One of ordinary skill in the art would appreciate that there are many process controls that could be used to limit or otherwise regulate the functionality of the player interface element, and embodiments of the present invention are contemplated for use with any such method.

According to an embodiment of the present invention, the player interface element is positioned in front of a player or otherwise accessible from a given player position. In a preferred embodiment, the player interface element can be located at any suitable position on the interchangeable gaming table that would allow a player to have simultaneous access to both the playing surface and the player interface element. Suitable locations for the player interface element include, but are not limited to, in front of the rail or cushion of the gaming table, connected to or embedded in the rail cushion, in a tray directly underneath the rail, or otherwise built into or attached to the rail or edge of the gaming table. In some embodiments, a player interface mounting element, such as a housing case, frame, or mounting bracket may be used to attach the player interface element to the gaming table. Alternatively, the player interface element may be formed from one or more of display elements that form the playing surface. For example, certain of the display elements making up the interchangeable gaming table playing surface could be configured to serve as the player interface element, thereby eliminating the need for a separately attached component. In such an embodiment, the display panels of the playing surface that are configured to function as the player interface element could be capacitive touch panels that are seamlessly arranged among rest of the display panels that form the playing surface. One of ordinary skill in the art would appreciate that there are many suitable designs and configurations for a player interface element, and embodiments of the present invention are contemplated for use with any such design or configuration.

According to an embodiment of the present invention, interchangeable gaming table or player interface element may include or otherwise allow for supplemental connections to a player's mobile computing device via a supplemental connection element. In a preferred embodiment, a supplemental connection element may include cables and other wires that connect to a player's mobile computing device to allow for charging or other functions, such as establishing a data connection. Likewise, the supplemental connection element may enable wireless charging or data connections. For example, the supplemental connection element may be charging pad that allows for wireless charging or a wireless data connection such as Bluetooth®, Wi-Fi®, or ZigBee®. One of ordinary skill in the art would appreciate that there are many supplemental connection elements that may be utilized by the interchangeable gaming table or player interface element, and embodiments of the present invention may be configured to take advantage of any such connection.

Exemplary Embodiments

Turning now to FIG. 3, an exemplary embodiment of an interchangeable gaming table layout in accordance with an embodiment of the present invention. In a preferred embodiment, the interchangeable gaming table 300 is comprised of a playing surface 301, a rail cushion 303, a dealer area 305 with a cheques/chips tray, and display element controller 307. The playing surface 301 is covered with a surface material that allows light from the display element to pass through the surface material so that it is visible to persons using the interchangeable gaming table 300. The display element controller 307 is used to control table layout what is displayed on the playing surface 301 of the interchangeable gaming table 300. In the preferred embodiment, all portions of the playing surface 301 are fully customizable, as the display element projects light through the surface material of the interchangeable gaming table 300.

Figure 4A:
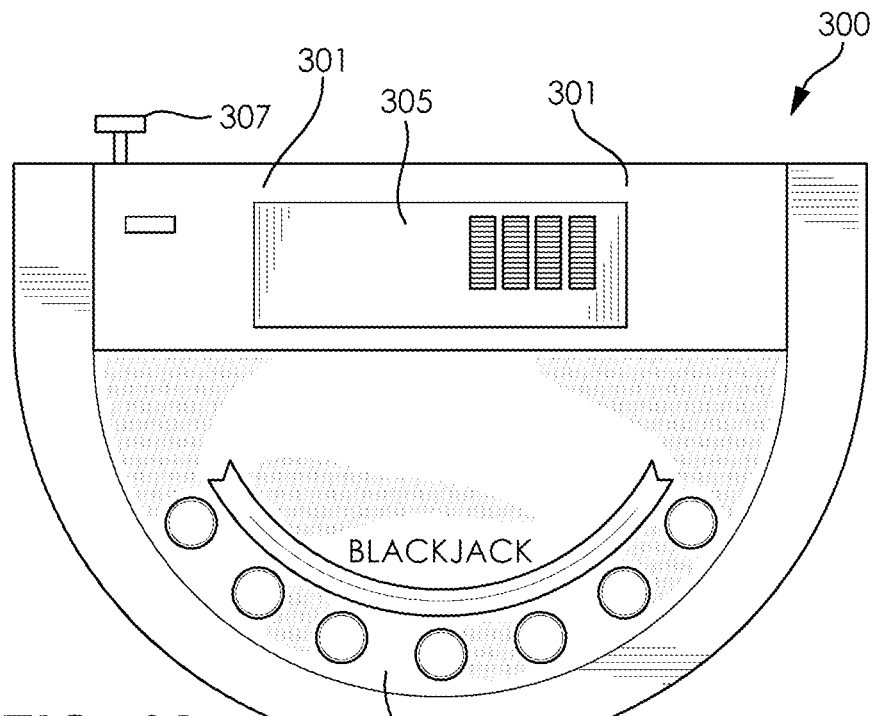
FIGS. 4A-C illustrate various gaming layouts of an interchangeable gaming layout in accordance with an embodiment of the present invention.
Figure 4B:
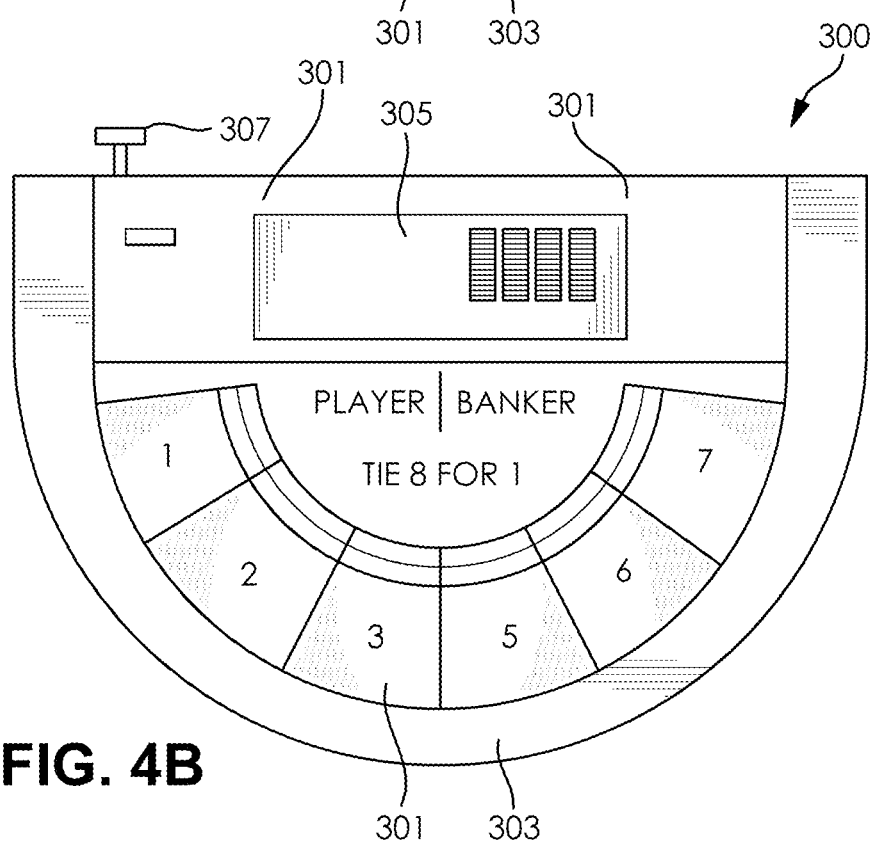
Figure 4C:
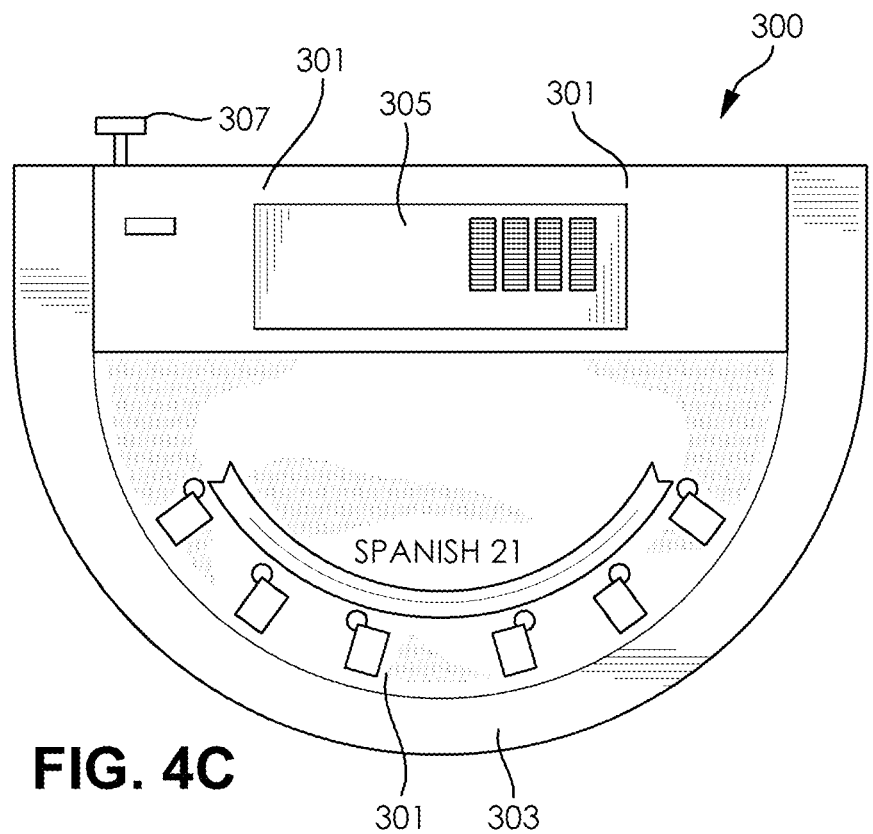

Turning now to FIGS. 4A-C, an exemplary embodiment of possible gaming table layouts for an interchangeable gaming table. In a preferred embodiment, the interchangeable gaming table 300 may be configured with a variety of game layouts including, but not limited to, black jack (FIG. 4A), poker (FIG. 4B), and Spanish 21 (FIG. 4C).

Figure 5:
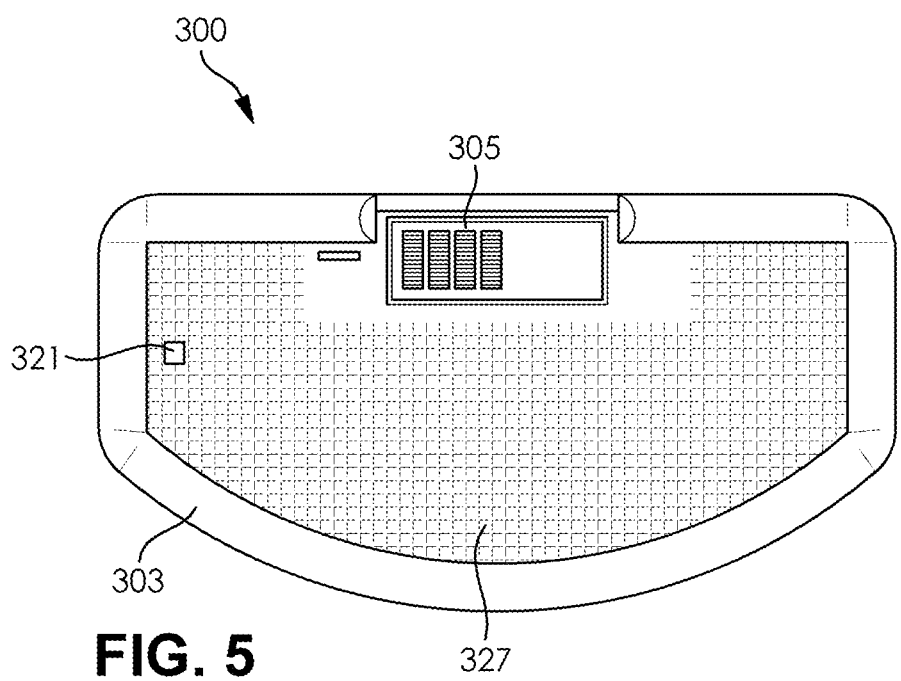
FIG. 5 illustrates a top view of an exemplary embodiment of the display element attachment points of the interchangeable gaming layout in accordance with an embodiment of the present invention.

Turning now to FIGS. 5 and 6, an exemplary embodiment of an interchangeable gaming table layout in accordance with an embodiment of the present invention. In a preferred embodiment, the interchangeable gaming table 300 is comprised of a playing surface (not shown), a rail cushion 303, a dealer area 305 with a cheques/chips tray, and display element controller 307. In the preferred embodiment, the playing surface is primarily comprised of a surface material (not shown) and a single, cohesive display element. In some embodiments, the display element may be comprised of multiple smaller, individual display components 321 that are connected to corresponding display element attachment points 327. In the preferred embodiment, the display element controller 307 is used to control what is displayed on the playing surface 301 of the interchangeable gaming table 300. In embodiments where the display element is made up of multiple individual display components 321, the display element controller 307 directs the individual display components 321 to function in unison as a single, cohesive display element.

According to an embodiment of the present invention, the use of multiple individual display components 321 allows for the construction of gaming layouts with various non-linear shapes. Advantageously, this allows for the system to be utilized to build gaming layouts suitable to accommodate the various table shapes of the games to be played. For instance, blackjack, poker, roulette and craps all use different gaming layouts. Through the use of multiple individual display components, these formats, and others, can be formed through connecting and/or positioning an appropriate number of individual display components in a manner such that the desired gaming format is formed.

In certain embodiments of the present invention, the individual display components 321 can be of various sizes and shapes and may be further interconnected with one another to work in unison to display to a single unitary gaming layout, image or a portion thereof. In certain preferred embodiments, the system may utilize individual display components 321 of independent LED lights (or similar light source) to form curves and are interconnected into a curved structure that is able to form a continuous image and/or gaming layout bounded by both linear and curved shapes. The images illustrated on such a gaming layout are specifically designed to accommodate the curve structure of a gaming table (e.g., blackjack).

According to an embodiment of the present invention, in order to configure and display the appropriate desired gaming layout to the individual display components 321 comprising the playing surface 301, a display element controller (whether local to the table, distributed or completely located remotely) is utilized. In a preferred embodiment, the display element controller includes the ability to easily build gaming table layout images while the gaming table is installed and in use.

According to an embodiment of the present invention, the display element controller includes a processor that can utilize a library of template images that together build a complete image necessary for game-play. In this embodiment, the display element controller may utilize the processor and the library of template images, usually provided to the display element controller or stored locally at the display element controller via a storage medium, to identify the various display elements of a playing surface and provide the correct images to each of the various individual display elements of the playing surface. Identification of the various display elements, and position information, may be handled, for instance, via a unique identifier given to each of the various individual display elements, such that the display element controller can receive or otherwise be provided the unique identifier and provide imagery based on the identified location of such individual display element. One of ordinary skill in the art would appreciate that there are numerous methods for providing positional information for each of the individual display elements to the display element controller, and embodiments of the present invention are contemplated for use with any appropriate method for providing positional information.

According to an embodiment of the invention, the display element controller may be configured to allow for completing images for display on the playing surface, across the plurality of display elements, through the use of layers of images. The layers of images may be retrieved from an image library and processed by the display element controller to illustrate a complete playing surface on the playing surface. The library of images can include images that can be used in layers to complete the images, including but not limited to, background graphics, playing spots, text describing elements of the game, odds or rules, notices of various types. Further, images from libraries may be processed by the display element controller for various effects, such as transparency, brightness, effect (e.g., blinking, rotating, flashing, 3D), contrast, tint or any combination thereof.

According to an embodiment of the present invention, the library of images may include moving images, scrolling images, text, illustrations, animations, or any combination thereof in any one of the layers or graphics. The display element controller can utilized these moving images to provide engaging content on the playing surface at critical times, such as before a game (e.g., entrance of a new player, departure of a player), during a game (e.g., player getting blackjack, insurance request by dealer, to indicate player's turn to decide whether to stay, hit or take other action), after a game (e.g., time to shuffle, change of dealers, incoming chips or cheque change/color up request), or any combination thereof. Further, images and animations may be utilized during standard game-play and not require a critical event or time to be engaged (e.g., scrolling text showing table limits).

According to an embodiment of the present invention, the system comprises one or more processing elements capable of transferring the images (e.g., moving or still) from a library of images to build the gaming layout by easily dragging and dropping said images into an area designated to represent the gaming surface by use of a human interface device, such as a mouse, touch screen or other interactive computer interface (e.g., keyboard, joystick, hand held controller).

According to an embodiment of the present invention, the system, preferably by way of the display element controller, provides the user the ability to preview compiled images for the playing surface prior to sending it to the display elements. In this manner, the user is able to ensure that the appropriate gaming layout is provided for the desired playing surface.

According to an embodiment of the present invention, the system may be configured to allow for management of images between the display elements remotely or though uploads/downloads via Wi-Fi, cable, internet IP, cloud connection, or other interface with the display element. For instance, a library of images can be loaded into the system via USB, computer disc, Wi-Fi, cable, internet IP, cloud connection, email or other interface.

According to an embodiment of the present invention, the system may be further configured to store and display the compiled images on the display element, where complied images are the result of a user arranging a plurality of library images into a single template for a playing surface. In this manner, users of the system are provided the ability to generate their own proprietary playing surface templates from a standard image library. Advantageously, users are given the opportunity to customize the look and feel of the associated playing surface to fit their particular desired appearances. Storage of these templates allows for recall and reuse without need to recreate the compiled image from the source images from the image library.

According to an embodiment of the present invention, the system may be configured to identify, record, store and analyze data associated with the various libraries and display elements utilized in order to allow for the identification of several important data points, including identifying what game is played, time for which the image is displayed (e.g., total time, start time, end time) and identification of elements in an image when the image is displayed on a display element.

According to an embodiment of the present invention, the system may be configured to add ad-hoc images based on display needs of an establishment such as advertising announcements videos, and messages. Ad-hoc images may be sent from a display element controller, central processing unit or other computing device or processor attached or communicatively connected to the system to be received by display elements of one or more playing surfaces such that the images may be displayed on any number of gaming tables. With respect to advertisements displayed, the system may further be configured to record metrics related to the advertisement for further utilization and data analysis at a later time (e.g., length of time displayed, number of times displayed, number of times interacted with by a player).

According to an embodiment of the present invention, the system may further be configured to allow for additional content to be displayed on the playing surface of the gaming tables, such as contests, additional games, and special in-house events. For instance, many casinos have added side games to Blackjack tables (e.g., lucky ladies, royal match, streak, over/under, pair play). By way of having a dynamic playing surface, the display elements of a playing surface may be changed at any time, generally through interface with a display element controller, to allow for additional content to be changed at will. In implementation, a Blackjack game played on a playing surface of the present invention could be configured to switch side games in between each hand, in between each shoe change, or any other specified time or event. Events could be triggered automatically, by certain events (e.g., player gets blackjack, dealer gets blackjack, dealer busts), manually, or any combination thereof. One of ordinary skill in the art would appreciate that there are numerous types of events that could be used in conjunction with embodiments of the present invention, and embodiments of the present invention are contemplated for use with any event type.

According to an embodiment of the present invention, the system may further be configured to allow for social messaging or other multi-player features via interaction with or display by the display elements. For instance, a playing surface may be integrated with touch capable display elements which would allow users to interact with the playing surface during game-play. By way of an example, players at a blackjack table may be able to interact with the table to receive instant advice as to whether they should hit, stay, double down or surrender on any given hand, based on the sum of the player's cards and the face-up card of the dealer. Further embodiments, may allow for communications between players at various tables at a casino or at a remote casino. One of ordinary skill in the art would appreciate that there are numerous social messaging features that could be utilized with embodiments of the present invention, and embodiments of the present invention are contemplated for use with any appropriate social messaging feature.

According to an embodiment of the present invention, the system may be further configured to allow for multi-player gaming of additional games other than card games such as roulette or slot machine type games. In these embodiments, the display elements of the playing surface may be configured to display the necessary game components of that game type. For instance, the display element controller may retrieve image content from associated libraries allowing for the transfer of images to the display elements of a playing surface that provides the electronic display of a roulette game (e.g., numbered squares). One of ordinary skill in the art would appreciate that there are numerous games that could be provided in this manner, and embodiments of the present invention are contemplated for use with any appropriate game type.

According to an embodiment of the present invention, the system may further be configured to allow a processor or other computing element of the display element controller to interact with a central gaming processor or central gaming computing device to display progressive or other jackpot amounts for play at the table. By interacting with a central gaming processor or central gaming computing device or system, the display element controller can receive continuously updating progressive amounts to be displayed on one or more of the display elements of the playing surface. In this manner, the playing surface of a gaming table may implement progressive style rewards for games not currently able to implement such rewards. Triggers for these progressive style rewards could be, for instance, when a player receives 4 aces in a single blackjack hand or a royal flush in poker. One of ordinary skill in the art would appreciate that there are numerous types of triggers that could be utilized and numerous types of progressive style rewards that could be utilized with embodiments of the present invention and embodiments of the present invention are contemplated for use with any appropriate trigger and/or progressive style rewards.

According to an embodiment of the present invention, the system may be further configured to allow for printing of information related to images displayed on the various display elements of a playing surface. For this purpose, the display element controller or other elements of the system may be configured to capture use and display data for output to a printing device, whether proprietary or a standard printing device.

According to an embodiment of the present invention, the system may be configured to allow users to interact with the playing surface (e.g., via a touch screen), for use with interactive games and game-play tutorials.

According to an embodiment of the present invention, the system may be configured to track players and bets and interact with player management systems.

Figure 9:
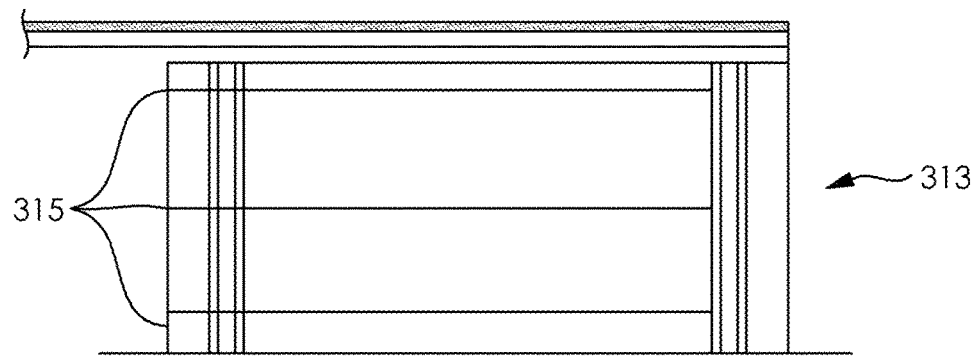
FIG. 9 illustrates an exemplary embodiment of a multi-section drop box for an interchangeable gaming layout in accordance with an embodiment of the present invention.

Turning now to FIG. 9, an exemplary embodiment of multi-section drop box in accordance with an embodiment of the present invention. In a preferred embodiment, the multi-section drop box 313 may be comprised of a plurality of different storage compartments that are divided by a plurality of dividing shelves 315.

Turning now to FIGS. 10 and 11, an exemplary embodiment of a gaming element on an interchangeable gaming table in accordance with an embodiment of the present invention. In a preferred embodiment, the gaming element 309 (for example, a discard rack) may be attached to the playing surface 301 of the interchangeable gaming table 300 with a securing element 311.

Figure 12:
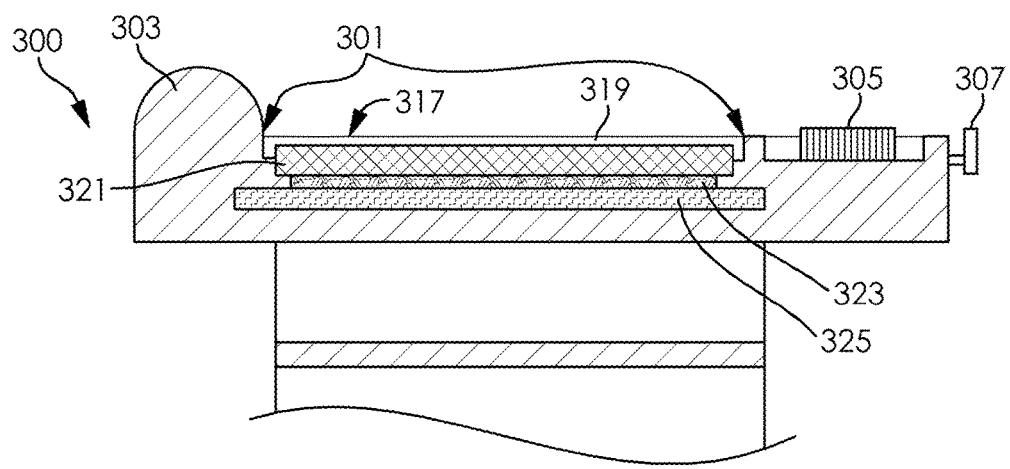
FIG. 12 is cross-sectional view of an exemplary embodiment of an interchangeable gaming layout in accordance with an embodiment of the present invention.

Turning now to FIG. 12, a cross-sectional view of an interchangeable gaming table in accordance with an embodiment of the present invention. In a preferred embodiment, the interchangeable gaming table 300, playing surface 301, rail cushion 303, dealer area 305, display element controller 307, surface material 317, protective layer 319, display element 321, wiring and electrical components 323, and a printed circuit board 325. In the preferred embodiment, the protective layer 319 protects the display element 321 from damage from dust, spills, and harmful impacts, while also allowing light from the display element 321 to pass through the protective layer and into the surface material 317. The surface material 317 is also sufficiently translucent to allow light from the display element 321 to pass through the surface material 317 so that is visible to users of the interchangeable gaming table 300. In the preferred embodiment, the surface material 317 simulates the characteristics of a playing surface of a standard gaming table in various respects including, but not limited to, flexibility, padding level, surface friction, visual appearance, and tactile feel.

FIGS. 3, 4A-C, and 12 further show exemplary embodiments of the present invention, with placements for cheques/chips, cushioned rails, surface material (i.e., felt) and other components. These figures are provided for the purpose of showing an exemplary embodiment and are not meant to be limiting. One of ordinary skill in the art would appreciate that there are numerous configurations of components that could be utilized in accordance with embodiments of the present invention detailed herein.

Figure 14:
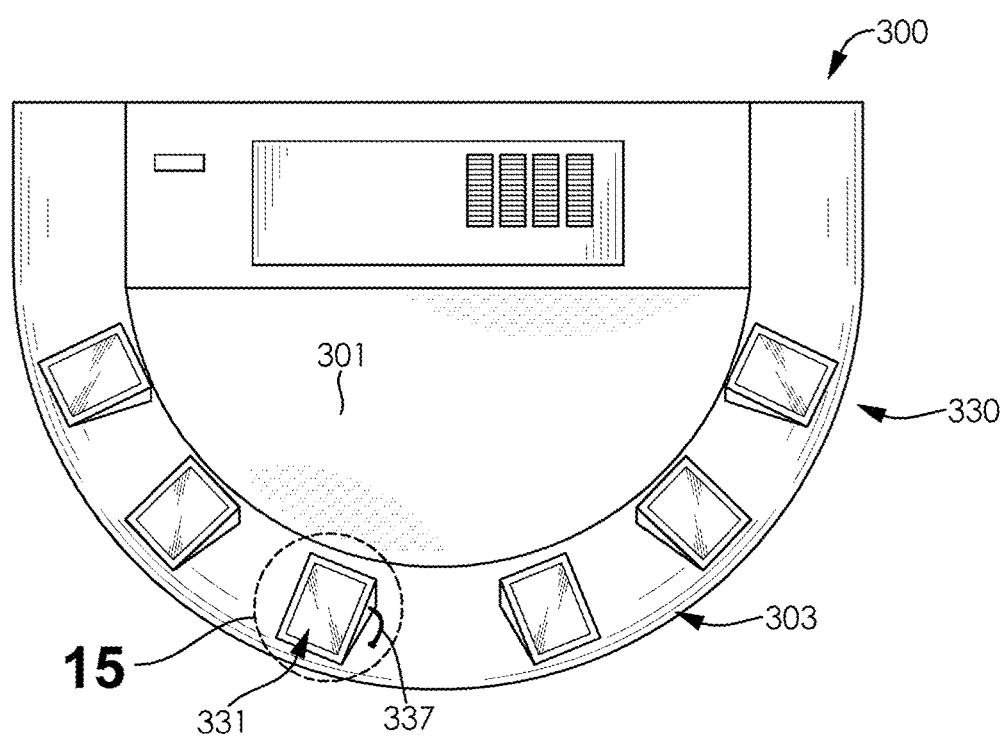
FIG. 14 illustrates an exemplary embodiment of a player interface element configured on an interchangeable gaming table in accordance with an embodiment of the present invention.

Turning now to FIG. 14, an exemplary embodiment of an interchangeable gaming table configured with player interface elements. In a preferred embodiment, the interchangeable gaming table 300 may be configured with a player interface element 331 at each of the player positions 330 or betting areas of the gaming table 300. In the preferred embodiment, the player interface element 331 may be attached to or otherwise extend from the rail cushion 303 of the gaming table 300 in a manner that allows a player to access both the playing surface 301, as well as the player interface element 331. In some embodiments, the player interface element 331 or gaming table 300 may further comprise a supplemental connection cable 337, such a charging cable or other wire, that would allow a player to charge their mobile phone or similar portable computing device.

Figure 15:
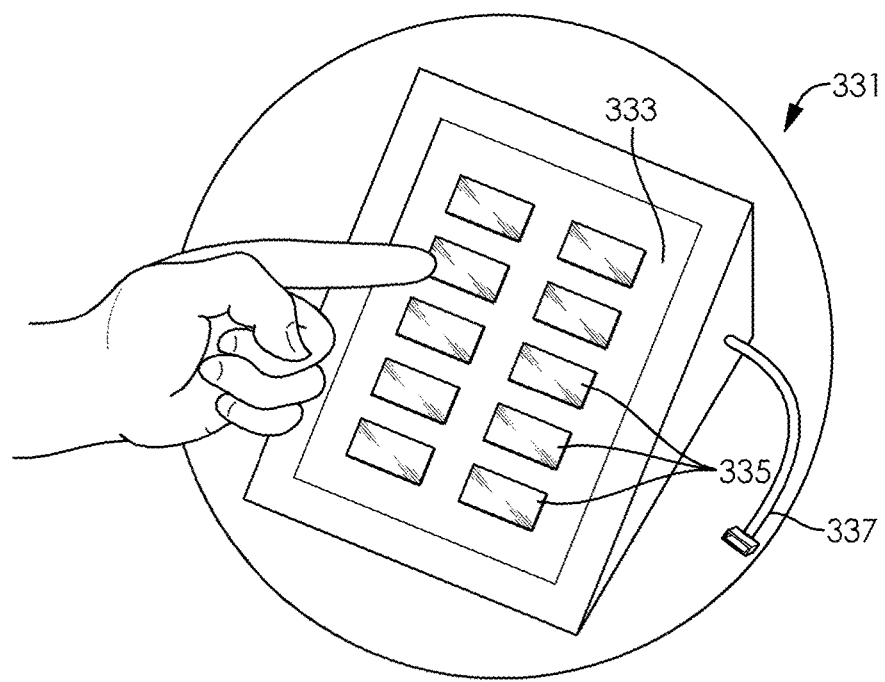
FIG. 15 illustrates an exemplary embodiment of the command buttons of a player interface element in accordance with an embodiment of the present invention.

Turning now to FIG. 15, an exemplary embodiment of player interface element of an interchangeable gaming table. In a preferred embodiment, the player interface element 331 may be a touch screen display 333 that presents a plurality of game control or command buttons 335. In the preferred embodiment, the game control or command buttons 335 are selectable by a player in order to allow a player to enter a command or game-play decision that is relevant to the game being played. Additionally, the game control or command buttons 335 may be configured to offer a player supplemental functions that are not related to game-play, such as booking hotel rooms in the casino's hotel, ordering drinks, and interacting with social media. In some embodiments, the player interface element 331 may include a supplemental connection cable 337 that could be used as a charging cable or data connection for a player's mobile phone or similar portable computing device. In some embodiments, the player interface element 331 may include a housing case that angles the touch screen display 333 towards the player, as well as providing protection to the touch screen display 333.

Methods of Use

According to an embodiment of the present invention, the interchangeable gaming layout system is fully customizable. In a preferred embodiment, the interchangeable gaming layout is fully customizable due to the use of the full color display element. In the preferred embodiment, the display element of the interchangeable gaming layout system is fully customizable and able to display a variety of different graphics and background items, including, but not limited to, the layout for a given game (e.g. player positions, rules, instructions, betting information, etc.), backgrounds (e.g. color of the table), logos and images (e.g. branding information, etc.), advertisements, or any other graphic that might be required by the end user. In some embodiments, the interchangeable gaming layout may be used for traditional board games or any table game that can be supported by video graphics. One of ordinary skill in the art would appreciate there are numerous games that an interchangeable gaming layout could be adapted for, and embodiments of the present invention are contemplated for use with any such game.

According to an embodiment of the present invention, the interchangeable gaming layout system may be used for several different purposes. On top of allowing for the changing of game content between various games and side bets, embodiments of the present invention may be configured to allow for the display of content during intermission events. Intermission events are times when game-play is halted. Some of these game-play events occur during regular intervals, such as when a shoe of cards comes to an end and the cards must be reshuffled. Other intermission events may occur on a non-standard basis, such as during the changing of a dealer, changing of a game type, during a break in play (e.g., tournament round end) or during game down time (e.g., no players currently at a table). One of ordinary skill in the art would appreciate that there are numerous types of intermission events that could be detected or identified to the system.

According to an embodiment of the present invention, the interchangeable gaming layout system may utilize intermission events to display non-game related content. Non-game related content may include, but is not limited to, advertising content, branding content, multimedia content, video content, or any combination thereof. For instance, the system may be configured to provide advertisements during intermission events. Advertisements could be, for instance, general advertisements, casino specific advertisements (e.g., restaurants in the casino, events in the casino, gaming information) or any combination thereof. Branding content may include, but is not limited to, videos about a casino, casino logos, casino artwork, or any combination thereof. Furthermore, the branding content would be completely customizable including customizable color schemes, insignias, and patterns that might be used to represent a particular brand. Multimedia content and video content may include, but is not limited to, any other video, audio or other content that the casino would wish to present to users during an intermission event (e.g., TV show, movie, music video).

According to an embodiment of the present invention, the interchangeable gaming layout system may be adapted to provide a customizable player seating layout. In a preferred embodiment, the system provides a seating layout that defines a position or spot for each player. In the preferred embodiment, this layout is customizable in order to adapt to the current demands of the game that is being played. For example, while the standard number of seating positions for a given game might be six (6) positions, the system is able to add additional seating positions as demand for the game increases, thereby allowing a casino or other gaming provider to increase revenue. Conversely, as demand for a game decreases, the system can simply be reverted back to its original or standard number of player positions. In some embodiments, the number of player positions may be decreased below the standard number of positions to accommodate other situations such as high-roller and VIP events or to provide a more comfortable experience to users gaming during low demand periods. One of ordinary skill in the art would appreciate there are many benefits to having a gaming table with an adjustable number of player positions, and embodiments of the present invention are contemplated to take advantage of any such benefits.

According to an embodiment of the present invention, non-game related content may be provided in a targeted manner. Since most table games have defined spots for players (e.g., seats) and players are identified by their seat through player cards or other membership means, specific non-game content may be played that is tailored for these players. In one embodiment, the entire display may be used to play non-game content targeted at one or more users. In other embodiments, the screen can be divided into a section for each player (or identified player) and individualized non-game content can be played for each player individually.

According to an embodiment of the present invention, the interchangeable gaming layout system may identify intermission events either manually, via notification from a dealer or other input (e.g., pit boss, input received from a control room). In other embodiments, the system may be able to automatically identify intermission events and affect the display of non-game content automatically. Automatic identification of intermission events may include detection of a shuffle event, detection of a game switch request or detection of a dealer switch.

For instance, the system may be configured to detect a shuffle event in one or more ways. Firstly, many casinos use automated card shufflers to shuffle decks of cards at the end of a shoe. These automated card shufflers already send a signal (e.g., light emission, signal emission) when shuffling or switching of shoes is started and ended. This shuffle signal can be detected by the system via a sensor element, and utilized to engage and terminate playback of non-game content. For instance, upon the detection of a start of a shuffle event, the system can begin playback of non-game content and terminate playback of non-game content upon detection of an end-of-shuffle event. In other embodiments, proprietary connections to the system may be made (e.g., USB, Firewire, data port) to an automated card shuffler for relay of start and end sequence signals from the automated card shuffler to the system. While this is just one example, one of ordinary skill in the art would appreciate that there are numerous other examples of intermission events that could be detected by the system and used for the start and stop of playback of non-game content.

Exemplary Method

Figure 13:
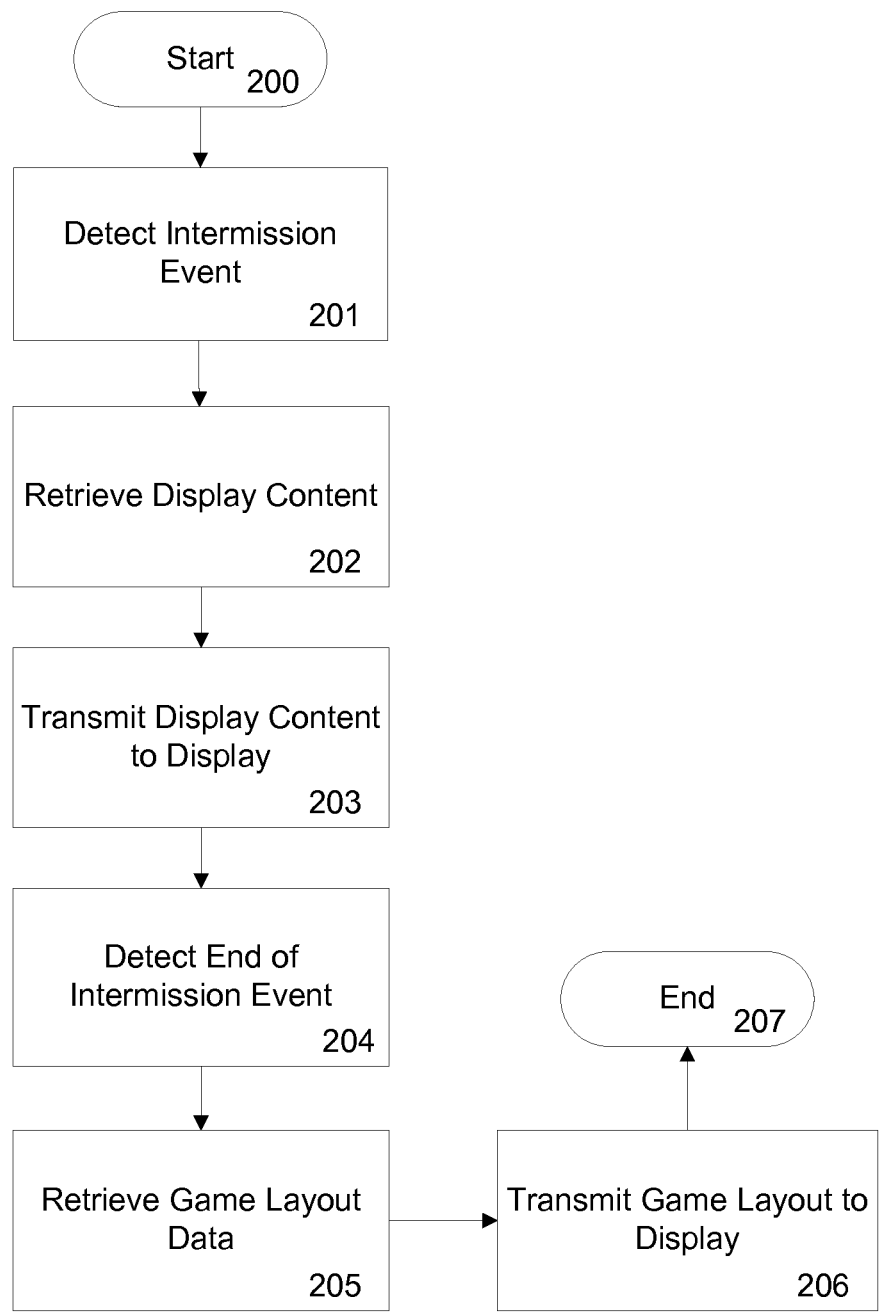
FIG. 13 is an illustration of an exemplary process flow, in accordance with an embodiment of the present invention.

Turning now to FIG. 13, an exemplary embodiment for the playback of non-game content is described. The process starts at step 200, at which time an intermission event occurs. At step 201, the system has detected the intermission event and sets about processing the method detailed herein.

At step 202, the system retrieves content to be displayed by the system on the display element. Generally, this is non-game content as detailed herein. The retrieval may be done from a local storage medium (e.g., hard drive, flash memory, solid state drive), or retrieved from a remote storage system (e.g., remote content server). One of ordinary skill in the art would appreciate there are numerous methods for the storage and retrieval of non-game content, and embodiments of the present invention are contemplated for use with any appropriate method for content retrieval.

At step 203, the system transmits the content to the display element for consumption by players or others in the vicinity of the display element. At some later time, the system detects an end-of-intermission event signal (step 204). At this point, the system retrieves the game layout data (e.g., game display information data) (step 205). The game layout data may be retrieved from a local storage medium or remote storage system. Similar to the non-game content, there are numerous methods for processing this retrieval.

At step 206, the system transmits the game layout data/information data to the display element and the game is displayed on the display element. At this point the process terminates at step 207 and the players can begin playing the game as usual.

While embodiments herein have been focused on usage in casinos, embodiments of the present invention could be used in any setting, including home use, usage in restaurants, bars or other entertainment facilities or any other setting.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. An interchangeable gaming table apparatus, the apparatus comprising:
   a plurality of LED display elements integrated into said gaming table and arranged proximate to one another such that together the plurality of display elements form a playing surface and display a selected game layout,
   wherein at least some of said display elements are player interface elements configured to receive input from a user that allow the user to manipulate virtual items displayed on said interactive elements and input game-play decisions and supplemental commands,
   wherein said player interface elements are positioned at a plurality of player positions arranged around a playing surface of the gaming table;
   a display element controller communicatively connected to each of said plurality of display elements, and
   a multi-compartment drop box embedded in said gaming table and configured to receive currency deposits, said drop box comprising a display element that indicates the amount of currency in the box and a sorter that separates and stacks currency bills according to denomination.

2. The apparatus of claim 1, wherein said player interface element primarily comprises a touchscreen display.

3. The apparatus of claim 1, wherein said supplemental commands are configured to provide control over guest hospitality selections and access to communications platforms comprising social media, message boards, and chat applications.

4. The interchangeable gaming table apparatus of claim 1, wherein at least one of said LED display elements is an OLED display.

5. The interchangeable gaming table apparatus of claim 1, wherein at least one of said LED display elements is a dot matrix LED display element.

6. The interchangeable gaming table apparatus of claim 1, wherein said drop box is configured to dispense chips in exchange for a deposit of currency into said drop box.

7. The interchangeable gaming table apparatus of claim 1, wherein said drop box is configured to record the game type being played at said gaming table.

8. An interchangeable gaming table apparatus, the apparatus comprising
   one or more LED display panels integrated into said gaming table and configured to display a selected game layout, wherein at least some of said display panels are player interface elements configured to receive input from a user that allow the user to manipulate virtual items displayed on said interactive elements and input game-play decisions and supplemental commands;
   a storage medium configured to store computer executable code that controls the display of said selected game layout on said one or more LED display panels;
   a padding layer that covers said LED display panels; and
   a felt cloth material that covers said padding layer, wherein said gaming table layout is visible through said felt cloth material;
   wherein said player interface elements are positioned at a plurality of player positions arranged around a playing surface of the interchangeable gaming table; and
   a multi-compartment drop box embedded in said gaming table and configured to receive currency deposits, said drop box comprising a display element that indicated the amount of currency in the box and a sorter that separates and stacks currency bills according to denomination.

9. The apparatus of claim 8, wherein each player interface element comprises a touchscreen display.

10. The apparatus of claim 8, wherein said supplemental commands are configured to provide control over guest hospitality selections and access to communications platforms comprising social media, message boards, and chat applications.

* * * * *